US011831851B1

(12) United States Patent
Tomren et al.

(10) Patent No.: US 11,831,851 B1
(45) Date of Patent: Nov. 28, 2023

(54) MULTIPLE CAMERA SENSOR SYSTEM (71) Applicant: Muybridge AS, Stord (NO)

(72) Inventors: Anders Tomren, Oslo (NO); Håkon Espeland, Oslo (NO)

(73) Assignee: Muybridge AS, Stord (NO)

(*) Notice: Subject to any disclaimer, the term of this patent is extended or adjusted under 35 U.S.C. 154(b) by 0 days.

(21) Appl. No.: 18/350,866

(22) Filed: Aug. 23, 2023

Related U.S. Application Data (63) Continuation of application No. 18/040,067, filed as application No. PCT/EP2021/071911 on Aug. 5, 2021.

(30) Foreign Application Priority Data

Aug. 5, 2020 (NO) .................................... 20200879

(51) Int. Cl.
*H04N 13/111* (2018.01)
*H04N 23/58* (2023.01)
(Continued)

(52) U.S. Cl.
CPC ......... *H04N 13/111* (2018.05); *H04N 13/158* (2018.05); *H04N 23/58* (2023.01); *H04N 23/90* (2023.01)

(58) Field of Classification Search
CPC .... H04N 13/111; H04N 13/158; H04N 23/58; H04N 23/90
See application file for complete search history.

(56) References Cited

U.S. PATENT DOCUMENTS 6,643,396 B1 * 11/2003 Hendriks ............... G01C 11/06
348/E13.016
6,778,207 B1    8/2004 Lee et al.
(Continued)

FOREIGN PATENT DOCUMENTS

EP       2860699 A1    4/2015
WO       9952288 A1    10/1999
WO    2019031873 A1    2/2019

OTHER PUBLICATIONS

Norwegian Industrial Property Office, Office Action for corresponding Norwegian Application No. 20200879, dated May 5, 2022, 1 page.
(Continued)

*Primary Examiner* — Hung H Lam
(74) *Attorney, Agent, or Firm* — Christopher & Weisberg, P.A.

(57) ABSTRACT

The present invention discloses a multiple camera sensor system and a method for any application and for a large number of different fields. The present invention is solving certain problems related to existing camera technology issues by introducing the possibility of getting several different camera inputs from the same source or moving shots/images without physically moving any cameras. It will minimize the physical presence of existing camera technology, size, weight and design and also to large extent avoid physical laws like gravity, vibrations, acceleration, retardation and speed. This may be implemented by means of a software virtually moving camera using multiple cameras sensors mounted consecutively along some attachment solution. This attachment solution may include e.g. tape or strips. The invention can be utilized in areas like industry and
(Continued)

production support, medical appliances, AV production, Video Conferencing, Broadcast, Surveillance and Security among others.

4 Claims, 7 Drawing Sheets

(51) Int. Cl.
  *H04N 13/106* (2018.01)
  *H04N 23/90* (2023.01)

(56) References Cited

U.S. PATENT DOCUMENTS

| | | | | |
|---|---|---|---|---|
| 11,443,555 | B2* | 9/2022 | Sriram | G06V 10/147 |
| 2010/0115411 | A1* | 5/2010 | Sorokin | H04N 7/15 |
| | | | | 348/148 |
| 2018/0332235 | A1 | 11/2018 | Glaser | |
| 2019/0164430 | A1* | 5/2019 | Nix | H04N 5/265 |
| 2020/0092488 | A1* | 3/2020 | Bhuruth | G06T 7/70 |
| 2020/0106966 | A1 | 4/2020 | Youngquist et al. | |
| 2022/0109822 | A1* | 4/2022 | Winter | G03B 17/02 |

OTHER PUBLICATIONS

Norwegian Industrial Property Office, Office Action for corresponding Norwegian Application No. 20200879, dated Feb. 18, 2022, 2 pages.
International Preliminary Report on Patentability, dated Nov. 28, 2022, for corresponding International Application No. PCT/EP2021/071911; International Filing Date: Aug. 5, 2021, consisting of 15 pages.
International Search Report and Written Opinion, dated Nov. 29, 2021, for corresponding International Application No. PCT/EP2021/071911; International Filing Date: Aug. 5, 2021, consisting of 13 pages.
Norwegian Industrial Property Office, Norwegian Search Report for corresponding Norwegian Application No. 20200879, dated Mar. 5, 2021, consisting of 2 pages.

* cited by examiner

$\theta_1$ = Angle of view [deg]

$\theta_2 = 90° - \frac{1}{2}\theta_1$ $d_1$ = distance between lens modules [m]

$d_2$ = minimum distance to the theoretical stitching area

Fig 4

Given:

$d_1 = 2R\sin(\Psi/2)$ computed on behalf of $d_2$ $d_2$ = Given criteria based on desirable application

Fig 5a

General formula: $d_2 = d_1/2 * \tan(90 - \theta_1/2)$

Chord length $C_L = 2R * \sin(\Psi/2)$, substitutes $d_1$

Angular offsets $\theta_{AO} = 90 - \theta_1/2 \pm \Psi$

MULTIPLE CAMERA SENSOR SYSTEM

CROSS-REFERENCE TO RELATED APPLICATIONS

This application is a continuation of U.S. patent application Ser. No. 18/040,067, entitled MULTIPLE CAMERA SENSOR SYSTEM, having a National Phase Entry date of Jan. 31, 2023 for PCT/EP2021/071911, filed Aug. 5, 2020, entitled MULTIPLE CAMERA SENSOR SYSTEM which is related to and claims priority to Norwegian Application Serial No. 20200879, filed Aug. 5, 2020, the entirety of all of which are incorporated herein by reference.

TECHNICAL FIELD

The present invention discloses a multiple camera sensor system and a method for any application and for a large number of different fields. The invention can be used in areas as industry and production support, medical appliances, AV production, Video Conferencing, Broadcast, Surveillance and Security among others.

BACKGROUND

There are several challenges related to existing camera technology, each in the respective field of which the camera technology is utilized.

The Security and surveillance camera solutions are generally based on one or several single fixed mounted or remotely controlled moving CCTV/PTZ (pan, tilt, zoom) cameras.

The cameras are mounted in strategic positions for the most efficient coverage of the areas of interest.

This can often mean that there are waste areas visually unattended or in blind spots. The amount or difficult or wrong placement of the cameras can demand extensive use of zooming inn for getting to the area of interest and will give the surveillance limited image quality and insufficient information.

In video conferencing, the conferencing/meeting rooms (and on computers) are usually equipped with one single camera mounted in close relation to the monitor (on the screen frame) with the incoming signal/image.

The common conferencing solutions are with wide or ultrawide lenses, or cameras with 2-3 lenses mounted together in a fan shape from a zero point of view, this to be able to provide the wanted coverage of the meeting room, table, blackboard or other presenting area, sometimes as much as 180 degrees.

The ultrawide and wide lenses have the disadvantage that the objects of interest will be smaller the wider the lens are. The existing solutions therefor often suffers from the choice between nearness or wideness, being unsatisfying to use in larger meetings because of long distances to the participants in the end.

Some high-end conferencing solutions can offer physically and mechanical moving single-lens PTZ cameras placed close to the monitor. These solutions can have software-controlled zoom and focus and can sometime place the talking person in the center. These solutions suffer from software controlled mechanical moving cameras. Auto-producing with one camera and several participants will result in over-panning, zooming and tilting, (moving too much and far in all axes) sound recognition issues and bad image control, camera stability and image quality.

The large amount of industrial camera solutions either made for inspections or surveillance during different production or processes are done with multiple single camera solutions. This means multiple mounting of cameras for larger installations, multiple cabling and connecting to the final output.

The domestic users, bloggers and semiprofessionals, business to business and others that are streaming to the internet are either using single web cameras or semiprofessional cameras. This can be single PTZ camera solutions or custom streaming cameras virtually doing face tracking and framing inside a larger high-resolution image than the output streaming resolution.

Through history of film and TV production moving cameras has been a crucial part of the storytelling. Making moving images has been and are still made with many different technical solutions. This can be camera on a bike, cars, trolleys, dolly's on tracks, cranes, steady-cams and robotic cameras free roaming or on track solutions. All the different technics have their advantages and disadvantages.

The problems are there regardless if the camera is physically moved around by a human or moved by a robot.

These problems are all basic physical problems such as gravitation, weight of the equipment, physical torque, long acceleration and retardation of the camera, hard stops, hard starts, limitations on speed, different types of resistance and resonance, uneven floor and speed will give vibrations during camera movement, either moving straight on the floor or on a roof or floor mounted robotic trolley-track.

All known camera systems and camera moving setups suffer from the limitations of being a physical object with a weight and being a volume, and therefore is a part of the world's physical laws.

The cameras and the camera-robots used in studio production are generally mechanically complicated, very large in size and area and space demanding for camera movements.

There are safety issues on most of the camera robotic systems on the market. This is making the presence of people in the studios during production where robotic cameras are in use prohibited.

Therefore there is a need for a system solving the camera related problems discussed above in various fields and applications.

SUMMARY

In view of the above, an object of the present disclosure is to overcome or at least mitigate at least some of the drawbacks related to cameras.

In particular, the present invention discloses a multi camera sensor system providing a target image by a virtual camera with a virtual camera field of view localized at a virtual camera point of view, including a number of camera sensors each with respective sensor fields of view consecutively positioned on one or more attachment devices adjusted to be attached to one or more surfaces, defining an n-dimensional space when attached to the one or more surfaces spanned by the positions of the camera sensors, a processing device at least adjusted to determine a current virtual camera point of view within the n-dimensional space, select image data captured by a first set of the camera sensors having sensor field of views which at least in combination are covering the current virtual camera field of view associated with the current virtual camera point of view, create the target image within the current virtual camera field of view by stitching the selected image data, and a transmission media inherently provided in or connected to the one or more attachment devices adjusted to transmit image data captured by the camera sensors and control data between the camera sensors and the processing device. The present invention also discloses a corresponding method.

DETAILED DESCRIPTION

The different aspects of the present invention are solving certain problems related to existing camera technology issues by introducing the possibility of getting several different camera inputs from the same source or moving shots/images without physically moving any cameras. It will minimize the physical presence of existing camera technology, size, weight and design and also to large extent avoid physical laws like gravity, vibrations, acceleration, retardation and speed.

This may be done by means of a software virtually moving camera using multiple cameras sensors mounted consecutively along some attachment solution. This attachment solution may include e.g. tape or strips. In the following, even if this solution is referred to as a certain concrete implementation, it must be understood that this is for the purpose of exemplifying only, and that the attaching solution may be implemented in many different ways.

According to some aspect of the present invention, the camera sensors are placed along the tape with a distance that provides image overlap that are software stitched together into a virtual camera or used as single cameras along the strip. This is generally illustrated in FIG. 1.

A virtual camera always consists of data from more than one image sensor. The virtual camera can be placed anywhere along the axis of the strip, even on arbitrary positions between two image sensors. For such positions, the field of view (FOV) and the point of view (POV) must be computed and updated according to interpolated and weighted pixel data from the active image sensors. Real-time 3D reconstruction algorithms will use data from several adjacent image sensors to ensure correctness in perspective changes.

Figure 1:
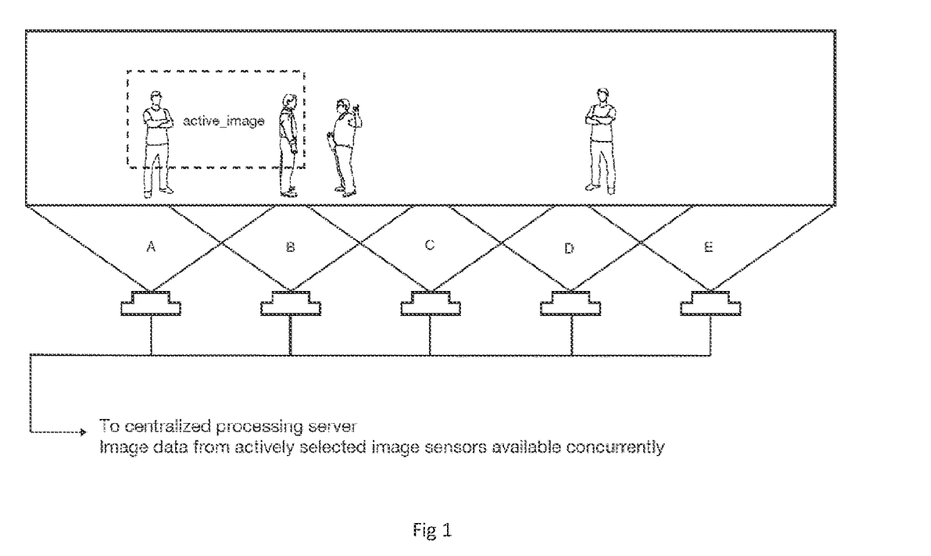
FIG. 1 Illustrates how image sensors according to aspects of the present invention create overlapping images through a fixed point of origin and its angular field of view, FIGS. 2a and b conceptually displaying two different stitching modules differentiated by the input.

As shown in FIG. 1, the active image is generated by a virtual camera located between the cameras with respective field of views A and B. This results in a perspective change which is mathematically defined within the perspective of A and B. By using interpolation, weighted pixels and 3D reconstruction, the correct perspective is generated for the active image.

Figure 2A:
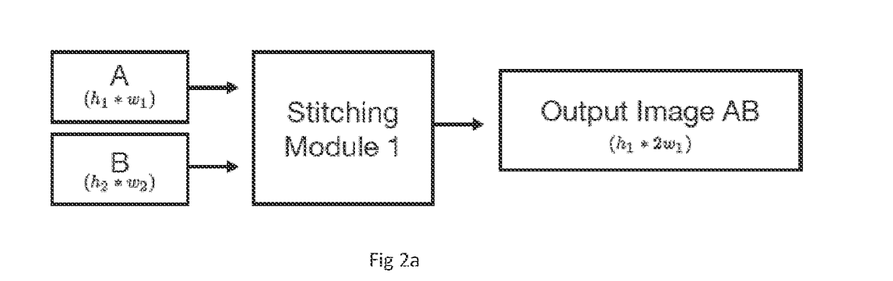
Figure 2B:
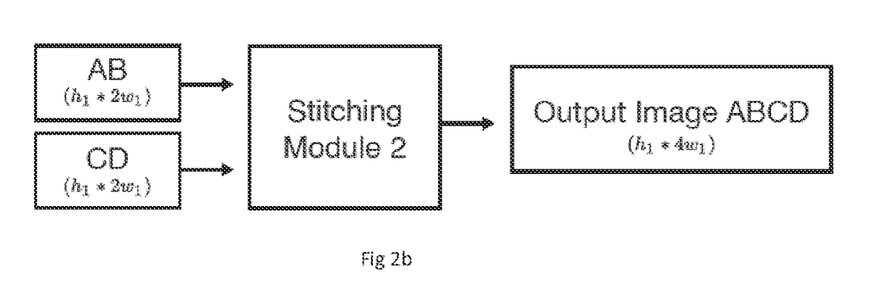

FIGS. 2a and b are illustrating two examples of stitching modules differentiated by the input. The stitching module of FIG. 2a is taking raw image sensor data as input, producing an AB image. The stitching module of FIG. 2b is taking an AB image as input, producing an ABCD image.

The camera strip can be placed/mounted and used in all the three axes (xyz) and over long distances/meters with a large amount (e.g. 100 or more) of camera sensors on the strip.

According to some aspects of the present invention, the camera sensors can be used and mounted as is with adhesive, but in other aspects, applied and built into any hardware casing/housings and been given nearly any shape and form. Examples of such different shapes and forms, being straight, convex, concave or a combination, are illustrated in FIG. 3a-3d.

Figure 3A:
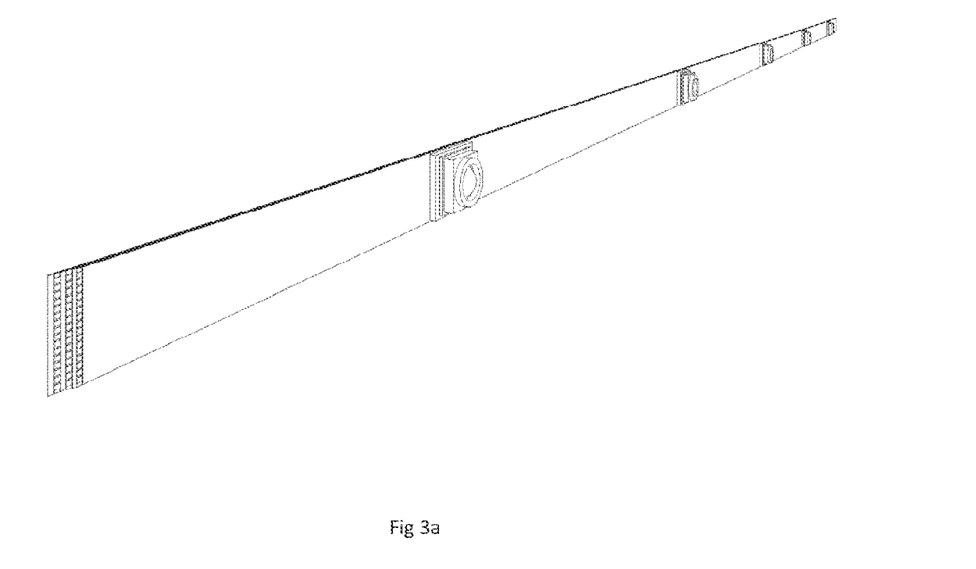
FIG. 3a illustrates image sensors mounted on a flexible multilayer PCB that can be shaped into any form and length.

The image sensors may be mounted on a flexible multilayer PCB that can be shaped into any form and length. Each image sensors placement on the tape (and in space) and their individual view will be calculated and calibrated in software providing precise positioning for each sensor on the PCB and given as input to the software modules to obtain an accurate output image.

This applies for both linear and non-linear surfaces (convex/concave and multi-shape applications).

Figure 3B:
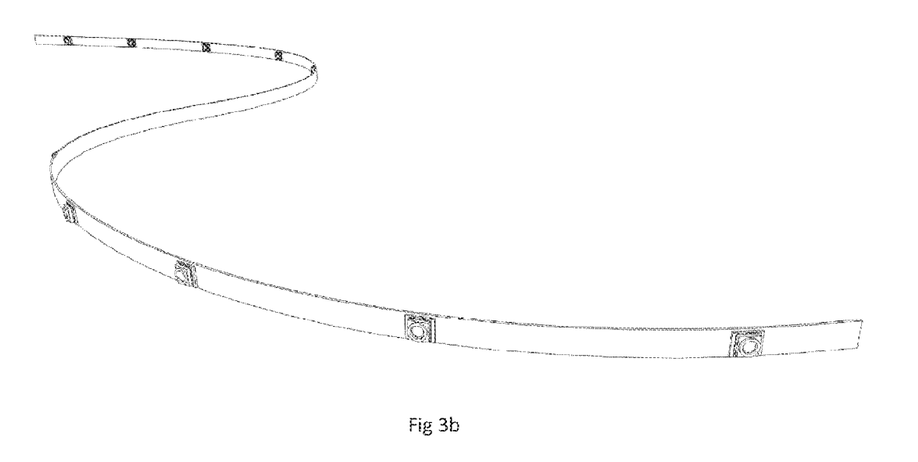
FIGS. 3b-d show how image sensors mounted on a flexible multilayer sensor tape can be given any form, shape and length.
Figure 3C:
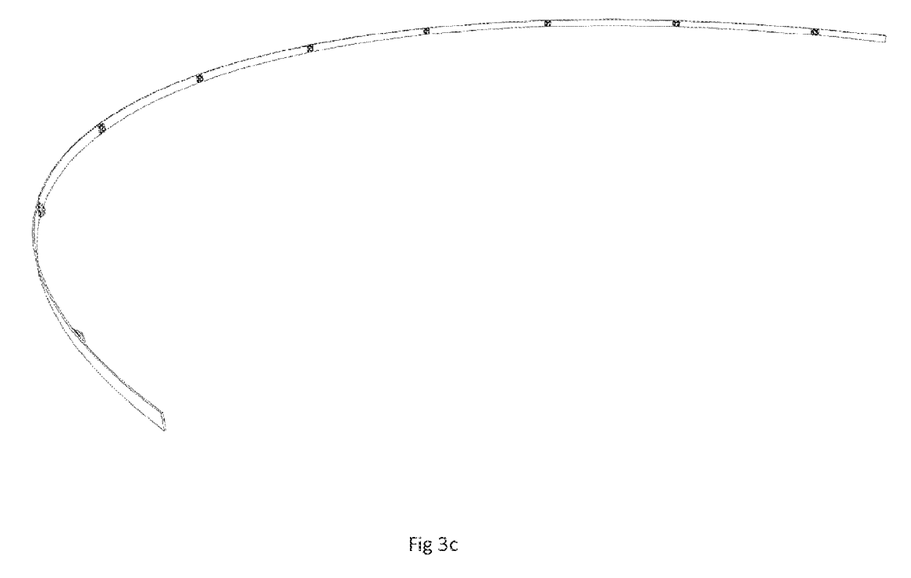
Figure 3D:
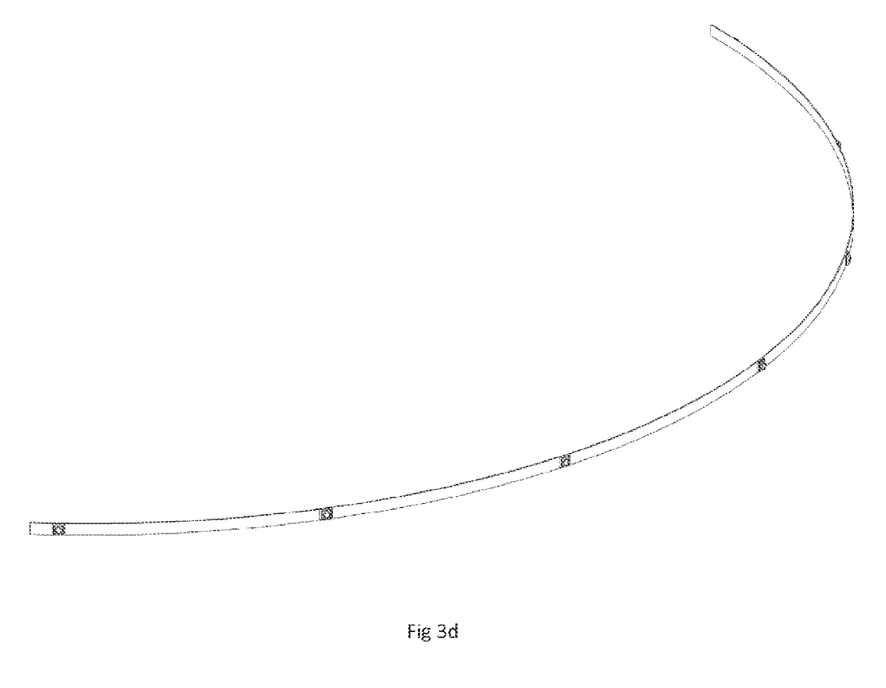

The image sensor tape can be given any form, shape and length. In non-linear surfaces convex/concave applications the image sensors placement on the tape (and in space) and their individual point of view will be calculated and calibrated and given as input to the software modules to obtain an accurate output image.

Figure 3E:
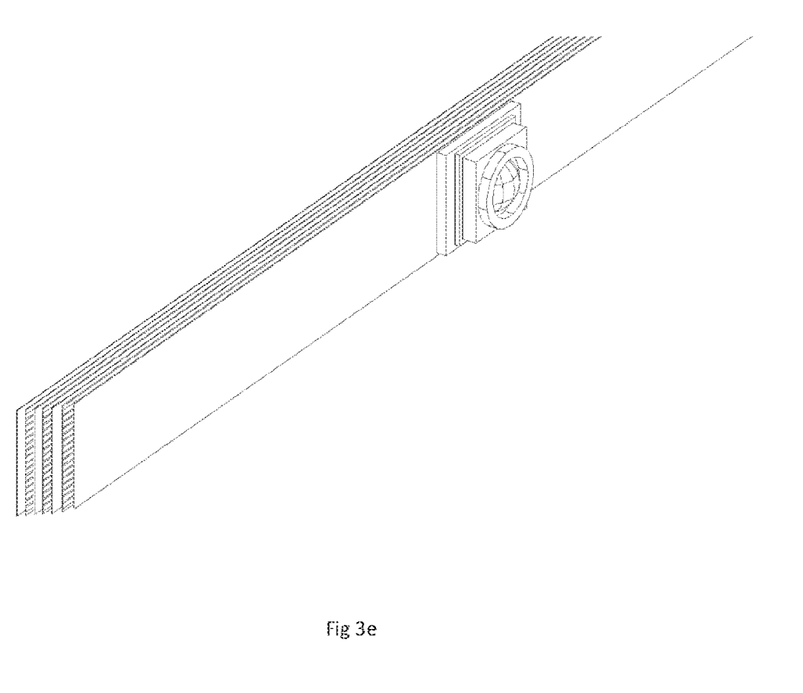
FIG. 3e is a closer view of how an image sensor may be mounted on a flexible multilayer PCB.

As indicated in the closer view in FIG. 3e, the image sensor PCB-tape may have dedicated sensor power layer, multichannel camera control and switching layers, signal transportation layers, isolation layers, isolation, cooling and adhesive layer for mounting as is, or in casing/housing.

Figure 4:
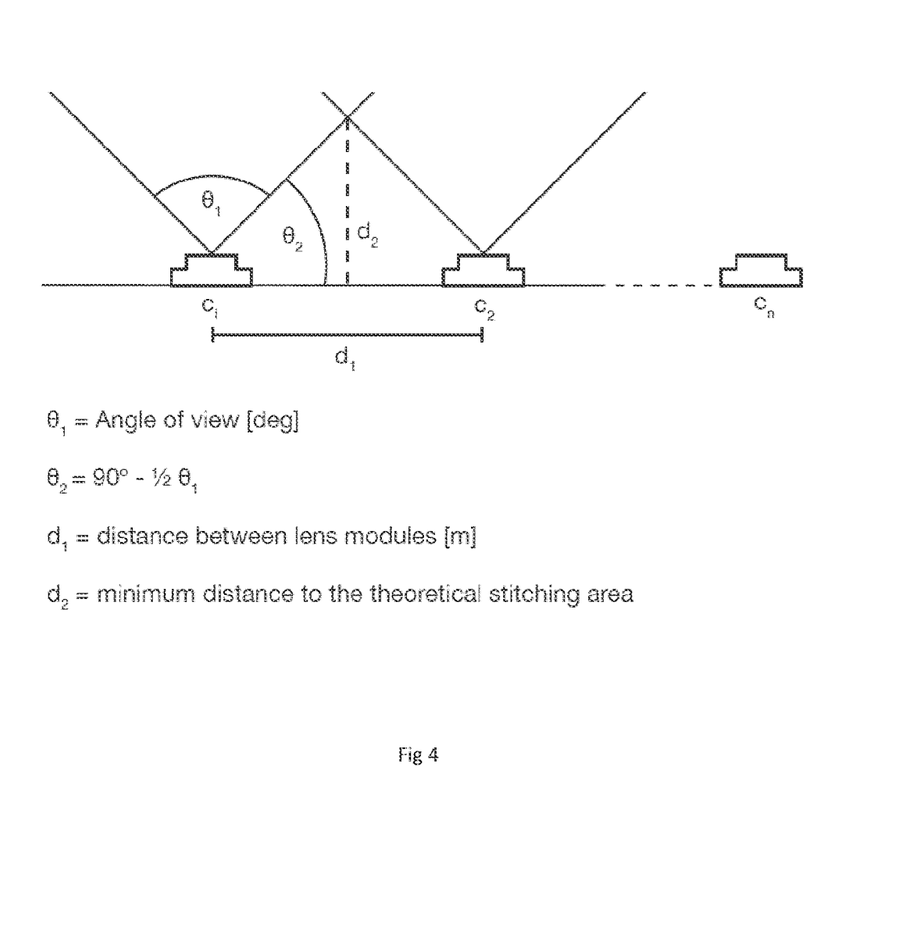
FIG. 4 is an illustration of parameters included in possible mathematical equations defining the relationship between them.

This provides the ability of being applied in several vertical business areas, with different applications and to work under different conditions, weather, pressure, water, altitude etc. Referring now to FIG. 4, examples of relationship between the image sensor field of view ($\theta$), distance between image sensors (d1) and minimum distance to theoretical stitching area (d2) may be as follows.

$$d_1 = 2 * d_2 / \tan(\theta_2)$$

$$d_1 = d_1 2 * d_2 / \tan(\theta_2)$$

Figure 5A:
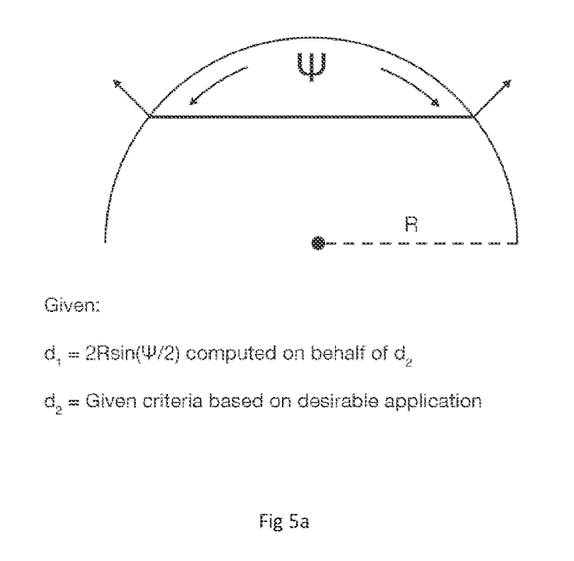
FIGS. 5a and 5b are illustrations of other parameters included in possible mathematical equations defining the relationship between them.

Referring now to FIG. 5a, the mathematical expression for how the image sensors are physically displaced when mounted on non-linear surfaces, may be as follows:

$$P_D = 2R\pi * \psi / 360$$

Figure 5B:
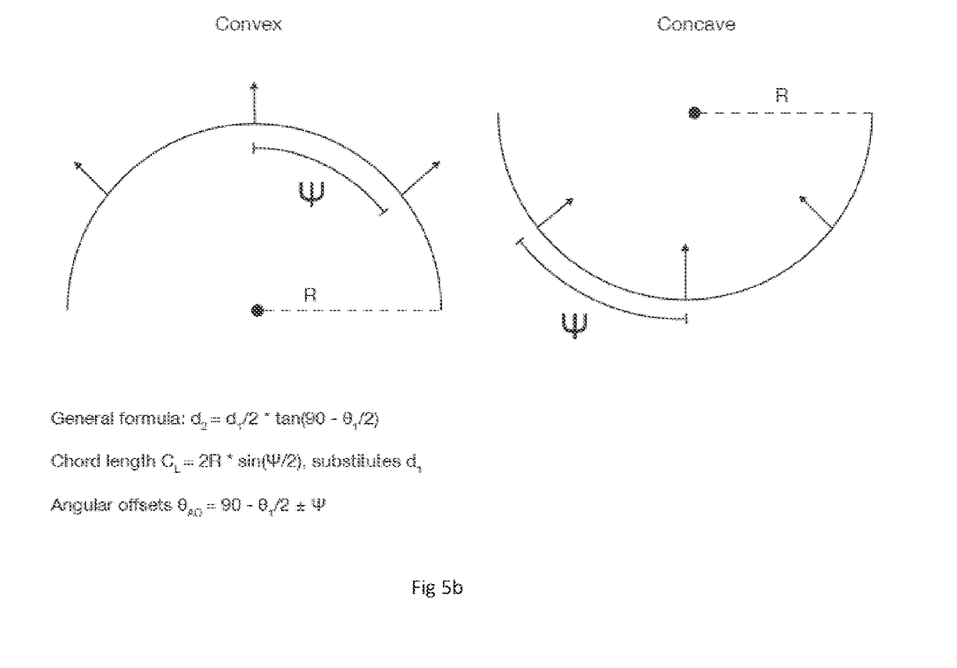

Referring now to FIG. 5b, the mathematical expression for how the image sensors are physically displaced when mounted on convex and concave surfaces, may be as follows:

$$d_2 = R * \sin(\psi/2) * \tan(90 - \theta_1/2 \pm \psi)$$

where positive $\psi$ is used for convex arcs, and negative iv is used for concave arcs.

According to aspects of the present invention, a high resolution multicamera solution is provided, where a large number of 40-megapixel (cellphone) cameras and higher (sensors with lens) are mounted in an image cluster bracket on one of the above mentioned flexible multilayer PCB tape. The cameras are then mounted consecutively on with a defined distance, to provide the required images regarding distance to focus of interest.

The camera sensors are mounted along the tape with an individual distance that provides camera image overlap on straight line or concave, convex as discussed and illustrated above.

The overlapping images are controlled by software, stitched together into a real time virtual camera movement. The camera tape can also provide several simultaneously single images along the strip. This means getting moving camera images without moving any physical cameras. All movements are made in software, and no moving parts need to be present.

The camera strip can be placed/mounted and used in all the three spatial axes (xyz) and over long distances/many meters with a large amount of camera sensors mounted on the strip. Several strips may be connected together either physically or virtually, to create one or more pictures from a point of view not necessarily directly localized on a camera strip, but also on a location in the spatial area defined by the camera strip axis. For example, if one first straight camera strip defines an x-axis of $(x_0-x_M)$ and a second straight camera strip provided perpendicularly to the first straight camera strip defines a y-axis of $(y_0-y_N)$, the resulting virtual camera point of view can be on any points of $(x_m, y_n)$, where m and n are floating numbers between (0,M) and (0,N), respectively, and where $x_M$ and $y_N$ represents the respective maximum lengths or the two perpendicularly provided camera strips.

As already mentioned, the camera sensor and lenses are mounted in a flexible multilayer PCB sensor cluster-bracket. This cluster bracket should be provided with the modularity and the flexibility to easy change and use different lenses and sensor configuration depending on application in use.

As illustrated in FIG. 3e, the flexible multilayer PCB tape is according to different aspects of the present invention designed and made from several layers to connect to the camera sensor cluster mounting bracket with the camera sensor.

Further, the PCB tape should preferably have a dedicated camera power layer, multichannel camera control and switching layers, signal transportation layers, isolation layers, shield layer and an adhesive layer.

In certain aspects of the present invention, the multilayer flexible PCB tape is designed to be produced in modular lengths and can be cut into desired length within.

According to different aspects of the present invention, the camera sensors and lenses on the tape may be high resolution mass-produced cellphone camera modules from 40 megapixels and higher. These image sensors provide a resolution as 4-8 K which is a bigger resolution than HD (broadcast) or video resolution published on the internet. This makes it possible to do software virtual moving and zooming within the 4-8 K frame. As mentioned above, the camera sensors on the camera strips and the communication and transmission of pixel values and control data are controlled by a remotely or locally (or both) localized software.

Figure 6:
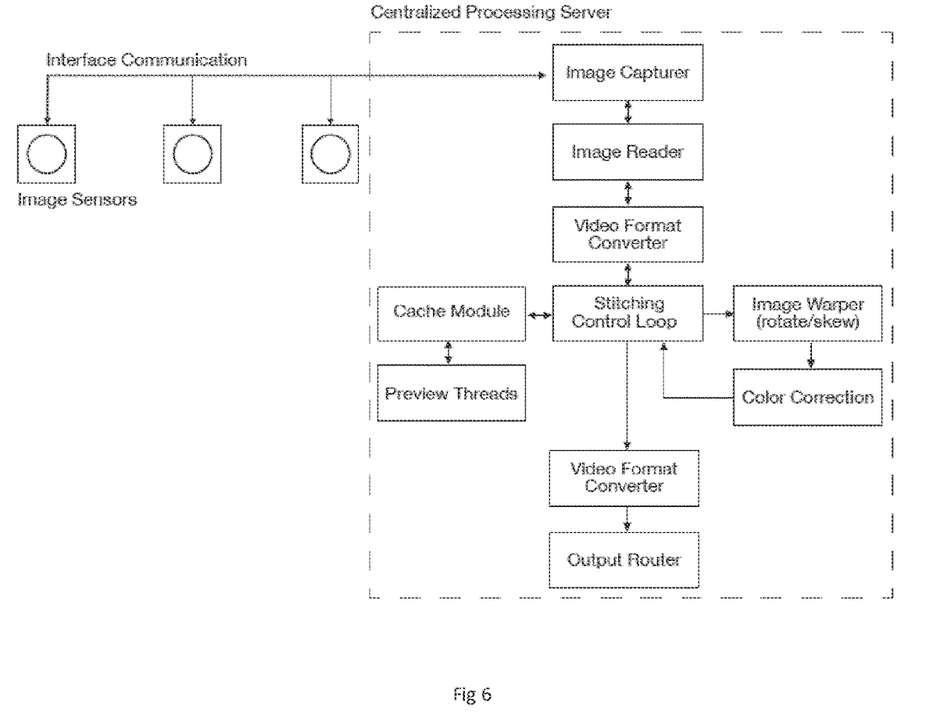
FIG. 6 illustrates a software architecture according to aspects of the present invention at a high level.
Figure 7:
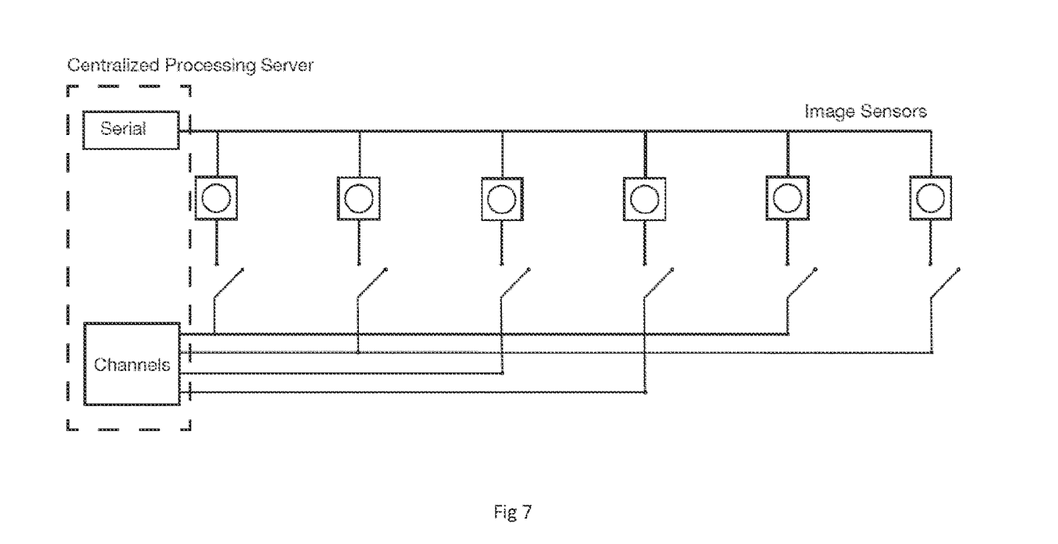
FIG. 7 illustrates a switch logic system simplifying scalability when a centralized processing server according to aspects of the present invention is running with a fixed number of serial channels.

According to certain aspects of the invention, the software is handling the camera-tape switching protocol on all camera sensors for distribution on several channels. Examples of this is illustrated in FIGS. 6 and 7. In the following, this example is discussed referring to the different modules in these figures.

The centralized processing server consists of hardware, operating system and software to facilitate the processing of incoming input signals from the image sensor strip. Conceptually the hardware features input/output (I/O) modules reading, converting or translating the input signals and computing power through a conventional or application specific server PC with processing units suitable for image handling. A centralized processing server can occur as a single setup, with multiple servers, locally or remotely, and does not remove a potential need of intelligent or processing units built into the image sensor strip.

The below software modules line out an architectural concept for necessary software modules. Other modules may occur as a necessity between modules, module order may change, and some modules may be combined or removed.

An image capturer consisting of hardware interfacing the image sensor circuitry and the image reader module, making data from all active image sensors readable.

The image reader actively selects image sensor data made ready by the image capturer based on the necessary data for the trailing processes.

A video format converter can be used in advance of the stitching module to optimize time complexity of stitching algorithms.

Using stitching algorithms, the stitching module stitches two input image matrices into one image represented as a matrix with an increased row range. The inputs can either originate from raw data from image sensors, or from single iteration outputs from the stitching module resulting in a second-degree stitch—stitching two already stitched images.

Multithreading is initiated to facilitate concurrent processing, making n preview threads available. Preview threads can be used internally in the software to cache processed images, output raw preview video, forwarded to calibration software improving total system performance and output.

The image warper performs manipulative operations to image matrices through rotation and skewing to optimize stitching areas and output fit.

The color correction module corrects image coloring based on the most recent output image or image pairs, ensuring color consistency in image output.

The stitching trailing from color correction operates in the same manner as the previous stitching module, stitching corrected images prior to the output pipeline.

A video format converter converts back from an algorithm-optimized format to the desired output format.

The output router has the possibility to output one or several images to a connected or programmed path.

Note that the software architecture is subject to change in order to optimize outputs based on the inputs, according to how inputs and output are defined in this patent document.

Image Sensors in series transmits image data concurrently to a centralized processing server where the Image Capturer, Image Reader and Video Format Converter ensures time-synchronized grouped image data to the Stitching Module. The trailing software modules compares and corrects the data to produce an accurate output image.

A switch logic system simplifying scalability when the centralized processing server is running with a fixed number of serial channels. The switch logic can be utilized to enable different segments of the image sensor circuitry.

According to one aspect of the present invention, the stitching software can be seen as simulating the human eyes. The human vision consists of images from two eyes/retinas (two viewpoints) that are split vertically and assembled in our brain into a coherent and "plausible" virtual representation of the environment. (binocular stereopsis)

The distance between the human eyes is providing the depth, length and distance information.

The stitching software may in certain aspects of the present invention handle stitching on two levels in the image processing. In the following discussion, A, B, C, D and E are cameras or camera input according to the corresponding denotations in FIG. 1. F is an imaginable camera adjacent to E.

An example of a first-degree stitching is illustrated in FIG. 2a when raw data from image sensors is provided as input: $A+B=(h_1*w_1+h_2*w_2)=h_1*2w_1$ Stitching Module 1 as illustrated in FIG. 2a is based on 1st degree stitching where two image sensors continuously feed the software module with time-synchronized image data, creating a virtual image output in a similar way as the human eyes. As static parameters for image sensors are known, this module should also perform lens corrections concerning viewpoint/point of origin, focal point and parallax offsets to provide the 2nd degree stitching with the same initial conditions as illustrated in FIG. 2b. The 2nd stitching module is taking an AB image as input, producing an ABCD image: $AB+CD=(h_1*2w_1+h_1*2w_1)=h_1*4w_1$.

Consequently, module 2 of FIG. 2b is handling the stitching between the virtual AB and CD. Module 2 is adapted to continuously stitching AB, CD and further neighbors EF and virtually enables movements of the point of view along the image sensor tape. Stitching an AB-CD is only performed when needed, for example during a virtual movement crossing the boundary between AB and CD, resulting in a 4 times wider image, where colors and skewing are performed based on the most recent outputted viewable image to ensure consistency in image output.

An expansion of this would be to virtually enable movements of the point of view in the two-dimensional x,y-space defined by two substantially perpendicularly provided camera strips as discussed above.

Based on known origins of each image sensor and a reference object, the system would have the capability to compute dept and distance. The virtual output image would preferably be composed by either a 1st degree stitch output, a 2nd degree stich output or higher order output, but rarely from a single image sensor. The software should preferably calibrate each image sensor based on a reference model and optimize the equality between the image sensors by inheriting parameters from the closest neighbor image sensor.

Supplementary to the discussion of stitching above, below is some aspects according to the present invention to be taken into account:

Output images such as AB and ABCD are available for all software processes in binary matrix form (pixel- and color-matrices etc.), and the active image is only a data selection which also includes the corresponding data (matrices) to create a final output viewable image.

Singular stitching should be set up as a continuous process, always stitching the adjacent lens (AB, CD, EF).

Stitching an AB-CD should only be performed when needed, for example during a virtual movement crossing the boundary between AB and CD, resulting in a 4 times wider image, where colors and skewing are performed based on the most recent outputted viewable image to ensure consistency in image output.

The supplementary aspects above ensure lens correction issues concerning the point of focus and parallax movements between objects in the foreground and background that occurs during movement in the different axes. This is important since the background and foreground objects in the current output point of view have to be moving in the right speed within the image during movement.

According to different aspects of the present invention, the software knows the "whole" image, while output is produced in the same way as e.g. zoom in on an image on a smartphone and move x/y, ie software selects column range and row range according to the desired aspect ratio on output.

The distance between the image sensors provides dept and distance information, the software calibrates every image sensor and what to process and not. The software output is usually when virtually moving a virtual representation, an image made from two or more images, rarely from a single sensor.

As aspects according to the present invention include several amount of image sensors, high precision optical measurements like distance to object and image scan etc can be provided. This information can be precomputed and used in the finished output or for reference to graphical engines, 3D models, virtual productions or output to other applications for other use.

Lens field of view (viewing angles), size of overlapping area and focus point determines the necessity of Singular 1-1 Clean Stitching or processing available completed 1-1 stitched images in the secondary stitching module, Stitching pre-stitched 1-1s.

The camera sensor strips as discussed in the present application can be used as is, mounted directly on an existing surface, on a set decoration piece, on a wall in a meeting room etc. Because of this flexibility, the present invention can be used in several industries and can go into several housings/casings depending on the application and use. This housing can be given nearly any shape or form to fit the industry, application and environment. The applications and fields of the present invention are further discussed in the following.

Security and Surveillance.

In this field, the present invention will provide a better view and a possibility of virtually moving the high-resolution camera coverage to the area of interest without loss of image quality.

The invention will be able to cover larger and wider areas than existing PTZ solutions without remotely and physically moving the camera with a camera controller, joystick or preset positioning.

The invention is a software controlled only and do not rely on any moving parts, robotic controller or motors that is needed for controlling the PTZ cameras. This means less risk of mechanical and camera controller malfunctions.

Video Conferencing and AV Applications

When using it in this field, the invention will provide a software controlled high resolution multicamera solution with a large number of cameras available for dedicated ready framed and focused presets of the participants for automated meeting production. The Invention can be used on existing monitoring, be placed strategically over and under the monitoring to give a software stitched eye direction correction.

These dedicated framed shots combined with cameras for overview total images, choice of listening images and dedicated document cameras.

The invention can be placed in several areas and axes and directions in the room Providing a different presence of the room and meeting than existing systems.

The invention will be able to deliver a much wider and deeper presentation in educational setups during lectures, people working on smart/white/blackboards due to multiple strips of cameras placed strategically in the lecture room.

Through interactive virtualization, meeting participants will have the ability to navigate and control their own point of view from the entire covered area, improving the sense of presence. The invention can be placed anywhere—obtaining the desired viewing area of a meeting room, participants, educational setups or whiteboards. Along with built-in support for augmented-/virtual-/mixed-reality, the invention is enhancing the opportunities with video conferencing compared to real-life meetings.

Industrial Appliances, Production and Installations

In this field, the invention's ability to be customized, given nearly any form, number of cameras and length, configurated and integrated in several casings/housings makes the invention extremely versatile for any industrial purpose inside or outside.

Domestic, Business and Semiprofessional Camera Production for Livestreaming or Other Video Publications.

The invention will provide the domestic and semiprofessional market with a professional production tool providing setups that can make still images from different angles and moving camera images in all axes.

Professional Studio, News, Sports and Arena Production Inside and Outside.

The invention introduces the possibility to make still images from several angles and moving camera shots without physically moving any camera in the setup. This can be in a studio, events or arenas inside or outside.

The invention can be fully integrated into the set design itself. The invention can be mounted in a given shape and camera trajectory designed housing that relates or blends into the studio design.

One of the advantages of the present invention is that the camera arrangement is small and not heavy weighted, and can easily be used on the road by journalists, press rooms and others that want several camera angles or moving images in their camera setup. Further the camera arrangement can be placed strategically alongside stages or sports arenas and events, being able to virtually provide moving camera shots of moving talents and athletes during performance.

The invention differences radically from existing camera setups in any known situation, industry or area.

The concept of using multiple High Definition lenses mounted along a strip/tape is new. The invention provides you with the possibility for individual single framed shots from different places, length and angles on the tape.

The invention gives the possibility for virtual movements along the tape in any desired axis, this without actually moving any physical camera.

The wanted trajectory or movement can be done as is or inside a housing designed into any shape or form.

The invention is therefore extremely adaptable to any industry or different use where there is needs for different angles, viewpoints, and or camera movement this provided from only one signal, one camera source.

The Invention due to its physical design, weight and size are less space demanding in most applications and installations.

The invention provides several different camera inputs (many cameras) from the same source or moving shots/images without physically moving any cameras.

The invention is not depending on the known physical laws regarding movement like earth gravity, acceleration, retardation, vibration, speed, fast camera movements, hard start or stop does not affect the camera movement in any way.

It must be emphasized that the terminology "comprise/comprises" as used in this specification is chosen to specify the presence of stated features, numbers, steps or components, but does not preclude the presence or addition of one or more other functions, numbers, steps, components or groups thereof. It should also be noted that the word "a" or "an" preceding an element does not exclude the presence of a plurality thereof.

ABBREVIATIONS

CCTV—Closed-circuit television
FOV—Field of view
PCB—Printed circuit board
POV—Point of view
PTZ—Pan, tilt, zoom

TERMINOLOGY

Point of view (POV)—A singular point in 3D space, whereas based on the viewing or capturing direction can obtain an infinite amount of unique field of views.

Field of view (FOV)—In photography, the field of view is the environment or scene visible through the camera. The field of view is made up by the origin point (point of view) of the image sensor and made up by the angle of view (the viewing angle defined by the lens).

In stereoscopic cameras and 360 panoramic cameras, the topology and arrangement of multiple cameras are based on having a common virtual point of view, which is a projection of all real point of views. Such camera systems have the possibility of generating several fields of views based on viewing direction, but only a single point of view as the projected virtual point of view is fixed. Similar to the human perception, standing at a single location in a room provides multiple fields of views based on where the human looks, but only a single point of view. To alter the point of view, the human is required to walk or move around in the room.

The invention claimed is:

1. A multi camera sensor system providing a target image by a virtual camera with a virtual camera field of view localized at a virtual camera point of view, comprising:
   a number of camera sensors each with respective sensor fields of view consecutively positioned on one or more attachment devices adjusted to be attached to one or more surfaces, defining an n-dimensional space when attached to the one or more surfaces spanned by the positions of the camera sensors,
   a transmission media inherently provided in or connected to the one or more attachment devices adjusted to transmit image data captured by the camera sensors and control data between the camera sensors and a processing device, characterized in that the processing device at least adjusted to:
   determine a current virtual camera point of view located between a first set of camera sensors within the n-dimensional space, select image data captured by the first set of the camera sensors having sensor field of views which at least in combination are covering the current virtual camera field of view associated with the current virtual camera point of view, and create the target image within the current virtual camera field of view by stitching the selected image data.

2. A multi camera sensor system according to claim 1, wherein the virtual camera point of view is movable, and the processing device is further adjusted to:
   determine an updated virtual camera point of view located between the number of camera sensors within the n-dimensional space different from the current virtual camera point of view,
   re-select image data captured by a second set of the number of camera sensors if the first set of the camera sensors do not have sensor field of views which at least in combination are covering the updated virtual camera field of view associated with the updated virtual camera point of view, and
   re-create the target image within the updated virtual camera field of view by re-stitching the selected image data.

3. A method for providing a target image by a virtual camera with a virtual camera field of view localized at a virtual camera point of view, characterized in:
   determining a current virtual camera point of view located between a number of camera sensors within an n-dimensional space defined by the positions of the number of camera sensors, each with respective sensor fields of view, consecutively positioned on one or more attachment devices attached to one or more surfaces,
   selecting image data captured by a first set of the number of camera sensors having sensor field of views which at least in combination are covering the current virtual camera field of view associated with the current virtual camera point of view,
   creating the target image within the current virtual camera field of view by stitching the selected image data,
   transmitting image data captured by the camera sensors and control data between the camera sensors and the processing device on a transmission media inherently provided in or connected to the one or more attachment devices.

4. A method according to claim 3, including the additional steps of:
   determining an updated virtual camera point of view located between the number of camera sensors within the n-dimensional space different from the current virtual camera point of view,
   re-selecting image data captured by a second set of the number of camera sensors if the first set of the camera sensors do not have sensor field of views which at least in combination cover the updated virtual camera field of view associated with the updated virtual camera point of view, and
   re-creating the target image within the updated virtual camera field of view by re-stitching the selected image data.

* * * * *